United States Patent [19]

O'Toole et al.

[11] Patent Number: 5,828,901
[45] Date of Patent: Oct. 27, 1998

[54] METHOD AND APPARATUS FOR PLACING MULTIPLE FRAMES OF DATA IN A BUFFER IN A DIRECT MEMORY ACCESS TRANSFER

[75] Inventors: Anthony J. P. O'Toole, San Jose; Sriraman Chari, Fremont, both of Calif.

[73] Assignee: Cirrus Logic, Inc., Fremont, Calif.

[21] Appl. No.: 576,869

[22] Filed: Dec. 21, 1995

[51] Int. Cl.[6] ................................................. G06K 13/28
[52] U.S. Cl. ........................ 395/842; 395/872; 395/200.66
[58] Field of Search ................................. 395/842–849, 395/825–827, 481, 601; 398/842–850, 872–877, 200.62–200.67

[56] References Cited

U.S. PATENT DOCUMENTS

| | | | |
|---|---|---|---|
| 5,251,303 | 10/1993 | Fogg, Jr. et al. | 395/844 |
| 5,316,582 | 5/1994 | Firoozmand | 370/400 |
| 5,386,532 | 1/1995 | Sodos | 395/842 |
| 5,388,237 | 2/1995 | Sodos | 395/842 |
| 5,483,665 | 1/1996 | Taniai et al. | 395/845 |
| 5,561,820 | 10/1996 | Bland et al. | 395/847 |
| 5,606,665 | 2/1997 | Yang et al. | 395/481 |
| 5,613,162 | 3/1997 | Kabenjian | 395/842 |
| 5,655,104 | 8/1997 | Petersen | 395/481 |
| 5,655,151 | 8/1997 | Bowes et al. | 395/842 |
| 5,664,116 | 9/1997 | Gaytan et al. | 395/601 |

*Primary Examiner*—Christopher B. Shin
*Attorney, Agent, or Firm*—Lowe, Price, Leblanc & Becker; Frank D. Nguyen

[57] ABSTRACT

A method and apparatus of managing a multi-channel direct memory access (DMA) operation in which a sequence of data frames are received at a controller that controls a DMA transfer. The data frames are placed in data buffers in a memory by the controller. Multiple data frames are stored by the controller in at least one of the data buffers. The storing of multiple data frames in a single buffer provides efficient utilization of memory space as large size buffers are used to hold more than a single data frame, and also reduces the management overhead involved in placing the data frames in the data buffers.

30 Claims, 13 Drawing Sheets

| EOB | EOF | |
|---|---|---|
| 1 | 0 | CHAINING - LONG MULTIPLE BUFFERS |
| 1 | 1 | BUFER TERMINATED AT END OF FRAME |
| 0 | 1 | MULTIPLE FRAMES PER BUFFER |

5,828,901

METHOD AND APPARATUS FOR PLACING MULTIPLE FRAMES OF DATA IN A BUFFER IN A DIRECT MEMORY ACCESS TRANSFER

FIELD OF THE INVENTION

The present invention relates to the field of data transfers in digital systems, and more particularly, to method and apparatus for managing the placing of data frames in data buffers in direct memory access (DMA) transfers of data in a multi-channel system.

BACKGROUND OF THE INVENTION

In a digital computer, a microprocessor operates on data stored in a main memory. Since there are practical size limitations on the main memory, bulk memory storage devices are provided in addition to and separately from the main memory. When the microprocessor wants to make use of data stored in bulk storage, for example, a hard disk, the data is moved from the hard disk into the main memory. This movement of blocks of memory inside the computer is a very time consuming process and would severely hamper the performance of the computer system if the microprocessor were to control the memory transfers itself.

In order to relieve the microprocessor from the chore of controlling the movement of blocks of memory inside the computer, a direct memory access (DMA) controller is normally used. The DMA controller receives descriptor information from the microprocessor as to the base location from where bytes are to be moved, the address to where these bytes should go, and the number of bytes to move. Once it has been programmed by the microprocessor, the DMA controller oversees the transfer of the memory data within the computer system. Normally, DMA operations are used to move data between input/output (I/O) devices and memory.

When conventional DMA controllers receive the end of a data frame, the DMA controller will terminate the data buffer in which the data is placed. The DMA controller will then retrieve the next available descriptor and data buffer for the next frame of data. For efficiency, the data buffer should be relatively large, so that it will nearly always be able to contain a complete data frame placed within the data buffer. This approach creates two problems, however.

The first problem with having a relatively large data buffer is that the memory is not efficiently utilized when the received frames are short frame data. When a large buffer is dedicated to holding only one short frame of data, there is a great amount of memory space that is wasted. This problem is made even more apparent when there are many short frames of data that are received.

A second problem with the conventional approach is the burden placed on descriptor management required by the use of a descriptor for each data buffer and each data frame that is received. If there is a burst of short frame data, the descriptors are quickly used up, and the host system may become overwhelmed. This problem is exacerbated in multi-channel systems in which short frame data may be received on more than one channel at a time.

SUMMARY OF THE INVENTION

There is a need for a method and apparatus that provides an efficient utilization of data buffers in a multi-channel DMA system, that avoids the wasting of memory space and reduces the burden on descriptor management.

This and other needs are met by the present invention which provides a method of managing a direct memory access (DMA) operation, comprising the steps of receiving a sequence of data frames at a controller in a DMA transfer and placing the data frames in data buffers in a memory. Multiple data frames are placed by the controller in at least one of the data buffers.

By providing for the controller to place multiple data frames in a single buffer, the wasting of memory space is avoided to a large extent since a number of short data frames can be placed in a single data buffer.

Another advantage made possible by certain embodiments of the present invention is that only a single descriptor needs to be provided for a plurality of data frames, since only a single descriptor is used for each data buffer and not for each data frame. This reduces the management overhead requirements imposed on a system by the receipt of bursts of short frame data, as each received frame of data does not require the controller to obtain another descriptor, as in conventional systems.

The earlier stated needs are met by another aspect of the present invention which provides a method of managing a multi-channel direct memory access (DMA) operation, comprising the steps of storing descriptors of data buffers in locations of a circular descriptor queue, obtaining with a network controller a set of available descriptors from the descriptor queue, and performing a DMA transfer with a host system via the network controller using at least some of the available data buffers whose descriptors were obtained, including storing multiple data frames in at least one of the data buffers.

The earlier stated needs are also met by another aspect of the present invention which provides an arrangement for managing multi-channel direct memory access (DMA) transfers of data, comprising a bus, a host system having a central processing unit (CPU) and a memory coupled to the bus, the memory having a plurality of data buffers, and a multi-channel network controller coupled to the bus. The network controller transfers data frames received at the network controller to the host system via data buffers that are available for use, wherein multiple data frames are stored in at least one of the data buffers.

The foregoing and other features, aspects and advantages of the present invention will become more apparent from the following detailed description of the present invention when taken in conjunction with the accompanying drawings.

DESCRIPTION OF THE PREFERRED EMBODIMENTS

Figure 1:
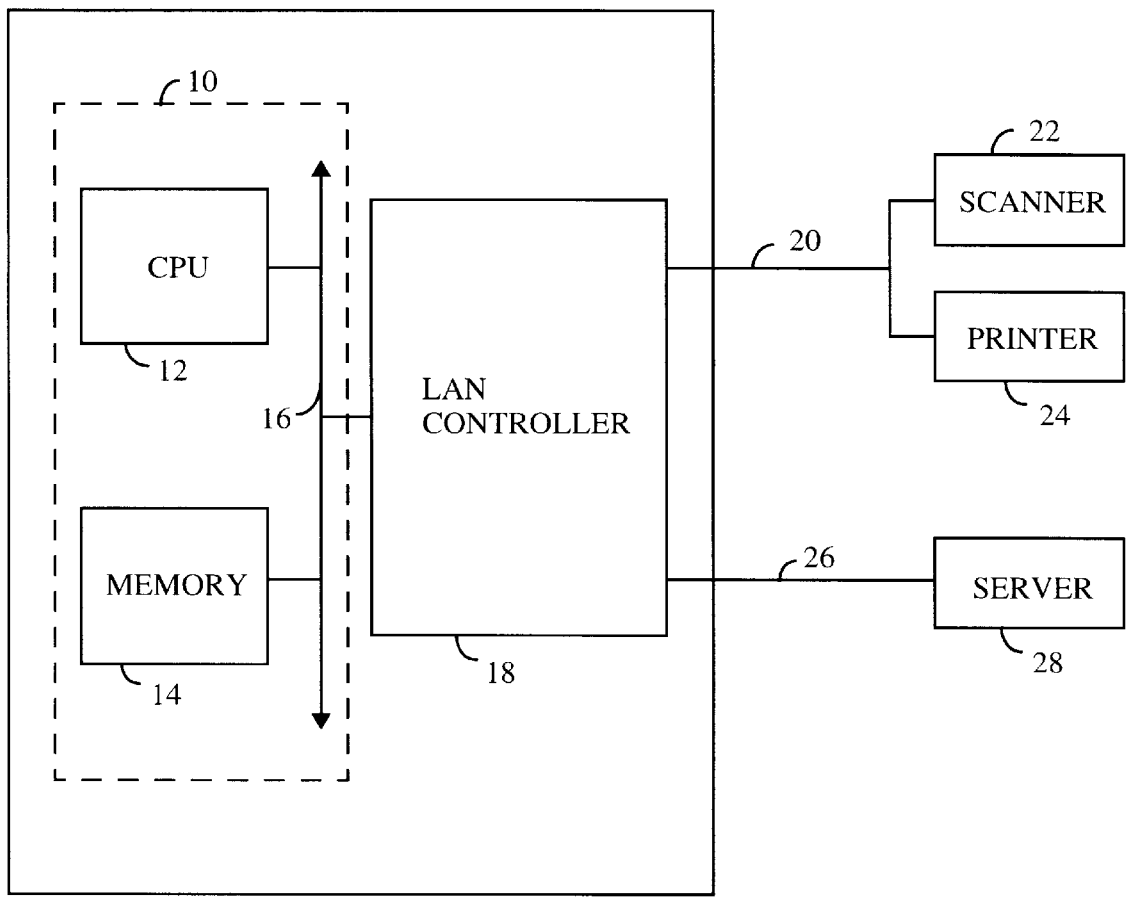
FIG. 1 is a block diagram of a multi-channel system constructed in accordance with an embodiment of the present invention.

FIG. 1 is a block diagram of an exemplary arrangement in which the present invention can be used. This arrangement includes a host system 10 that includes a central processing unit (CPU) 12 and a host (or main) memory 14. The CPU 12 and the host memory 14 are both coupled to a bus 16, for example, a peripheral component interconnect (PCI) bus.

The host system 10 has a multi-channel network controller 18 that provides DMA control and an interface between the host system 10 and peripheral devices and external networks. For example, the multi-channel network controller 18 in FIG. 1 is depicted having an interface to a SCSI line 20, to which a scanner 22 and a printer 24 are connected. On a different channel, the network controller 18 provides an Ethernet interface (10Base-T or 100Base-T, for instance) for an Ethernet line 26 to which a server 28 is connected.

The network controller 18 operates as a bus master to transfer all receive and transmit, data and status, across the PCI bus 16. The transfers are managed by two sets of queues, a descriptor queue and a status queue. These queues are located in host memory 14. The network controller 18, which will be described in more detail later in FIG. 10, contains a receive descriptor processor that uses the two circular queues in host memory 14 to manage the transfer of receive data frames.

Figure 2:
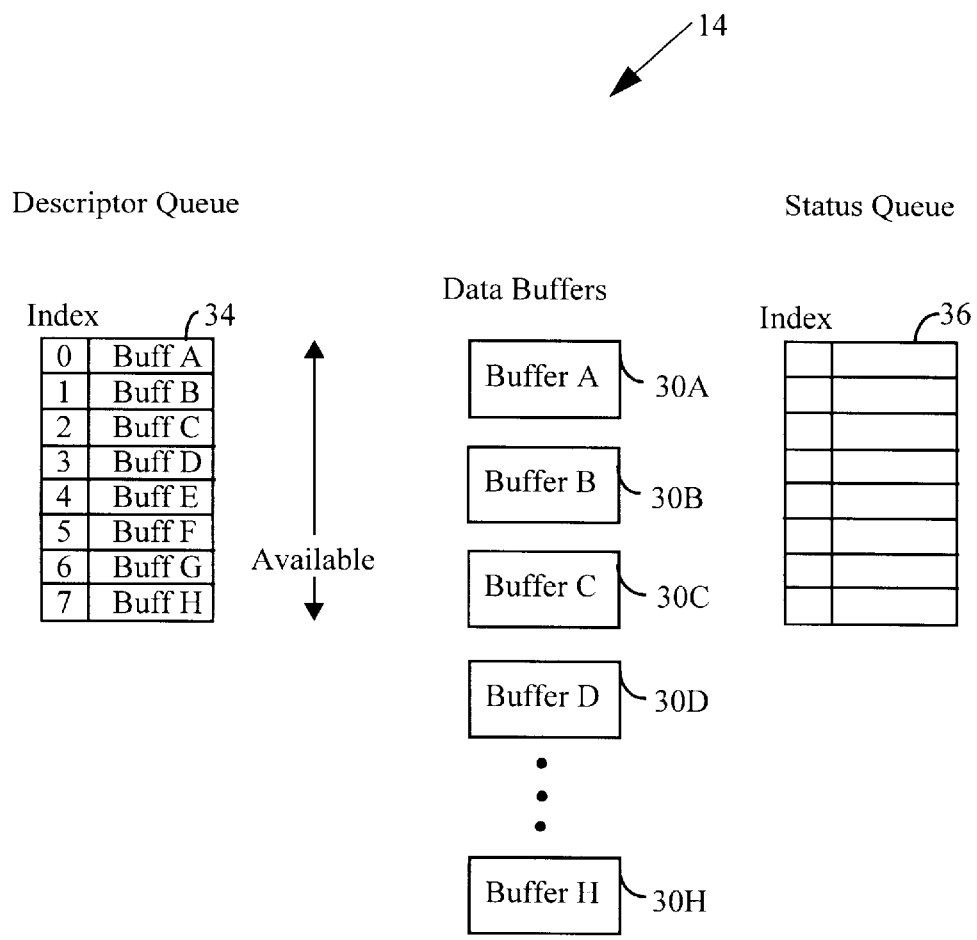
FIG. 2 is a block diagram of a system view of a portion of host memory.

FIG. 2 is a logical view of a portion of the host memory 14. The host memory 14 is configured to have a number of data buffers 30 that buffer the data received from the network controller 18 and which will be used by the host CPU 12 and/or stored in memory locations, such as on a hard-disk drive. As shown in FIGS. 6a–6d, the CPU 12 includes a reference table 32 containing information, such as the size of each of the specific data buffers 30. The reference table 32 is accessed through an index given for each data buffer 30. The reference table 32 provides a stable source of information for the CPU 12 regarding the different data buffers 30, since it remains unchanged through data transfer operations, unless it is modified by the CPU 12.

The two circular queues in the memory 14 manage the transfer of receive data frames. A receive descriptor queue 34 informs the network controller 18 of which data buffers are available for use, by passing descriptors of data buffers that are currently "free" (available to receive data) from the memory 14 to the network controller 18. A receive status queue 36 receives status entries from the network controller 18 that indicate when a data buffer has been used to store a frame of data. The separation of the receive descriptor queue 34 and the receive status queue 36 enables the use of burst transfers of descriptors and of status entries to and from the queues 34, 36. This reduces the overall amount of bus usage, since the bus does not have to be accessed for each descriptor and for each status entry individually, but rather is accessed for bursts of descriptors and bursts of status entries.

Receive descriptors are passed from the CPU 12 and the host memory 14 to the network controller 18 via the receive descriptor queue 34. The receive descriptor queue 34 is a circular queue occupying a contiguous area of memory. The location and size of the queue are set at initialization by the CPU 12 writing to a receive descriptor queue base address register, a receive descriptor current address register, and a receive descriptor queue base length register, these registers not being illustrated. In certain embodiments of the invention, the descriptor queue base address points to a double word aligned, memory location. The current address is set to point to the next descriptor to be used, this initially normally being the first entry (same value as the base address). The receive descriptor queue base length is set to the length in bytes of the receive descriptor queue 34, the length being an integral number of descriptors.

Figure 6A:
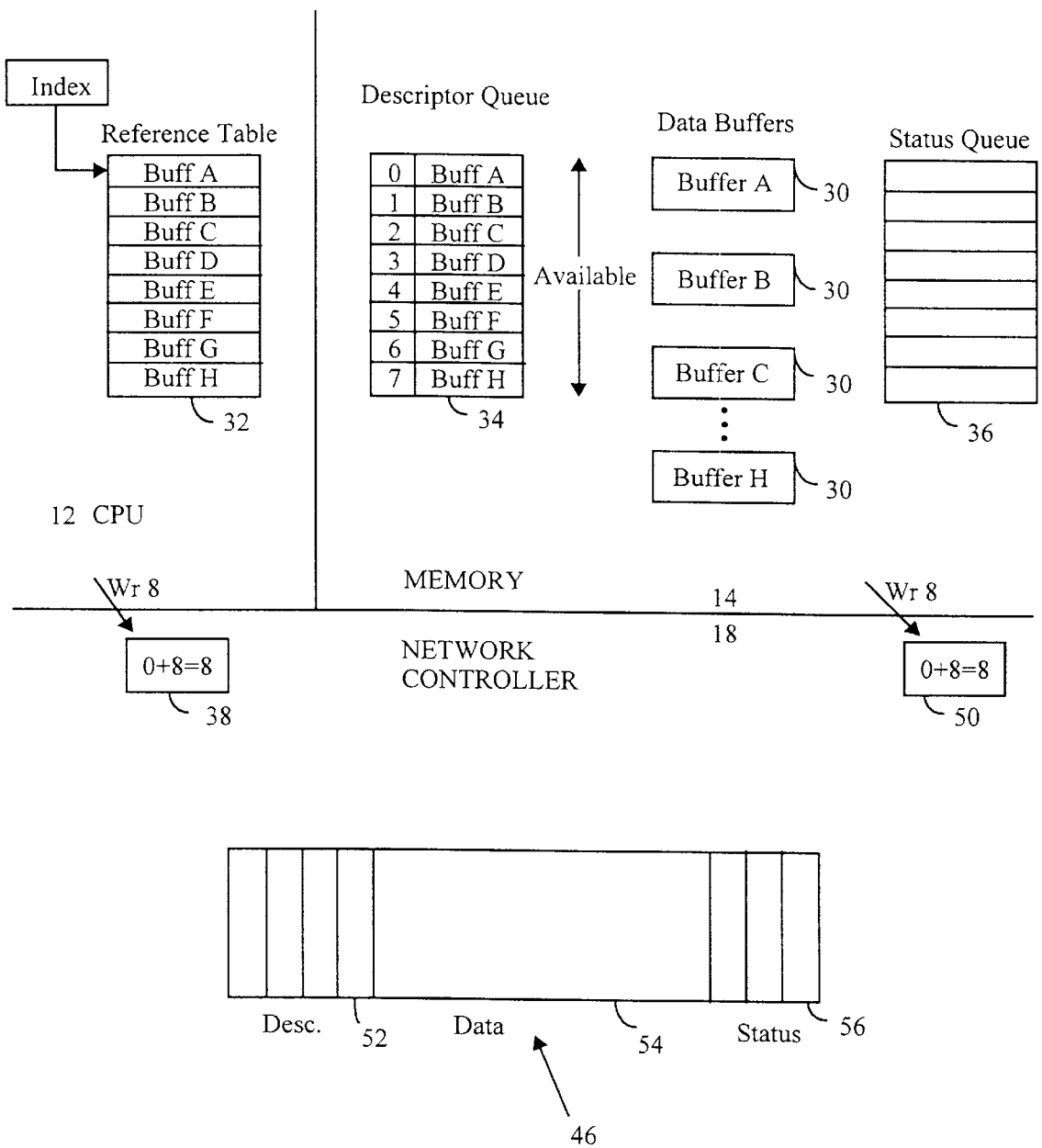
FIGS. 6a–6d schematically depict portions of a central processing unit, a host memory, and a network controller in various stages of a receive operation in accordance with an exemplary embodiment of the present invention.

In normal operation, following initialization, the CPU 12 does not need to access the receive descriptor base starting address register, the receive descriptor base length register, or the receive descriptor current address register. Control of the use of the descriptors is handled using a receive descriptor enqueue register 38 (FIG. 6a). The term "enqueue" refers to the action of adding descriptors to the end of an existing receive descriptor queue 34. To enqueue receive descriptors the CPU 12 writes the number of descriptors to the receive descriptor enqueue register 38, and the number is automatically added to the existing value. When the network controller 18 consumes descriptors by reading them into its on-chip storage, the number read is subtracted from the total. The CPU 12 can read the total number of unread valid descriptors left in the receive descriptor queue 34 from the receive descriptor enqueue register 38.

Figure 3:
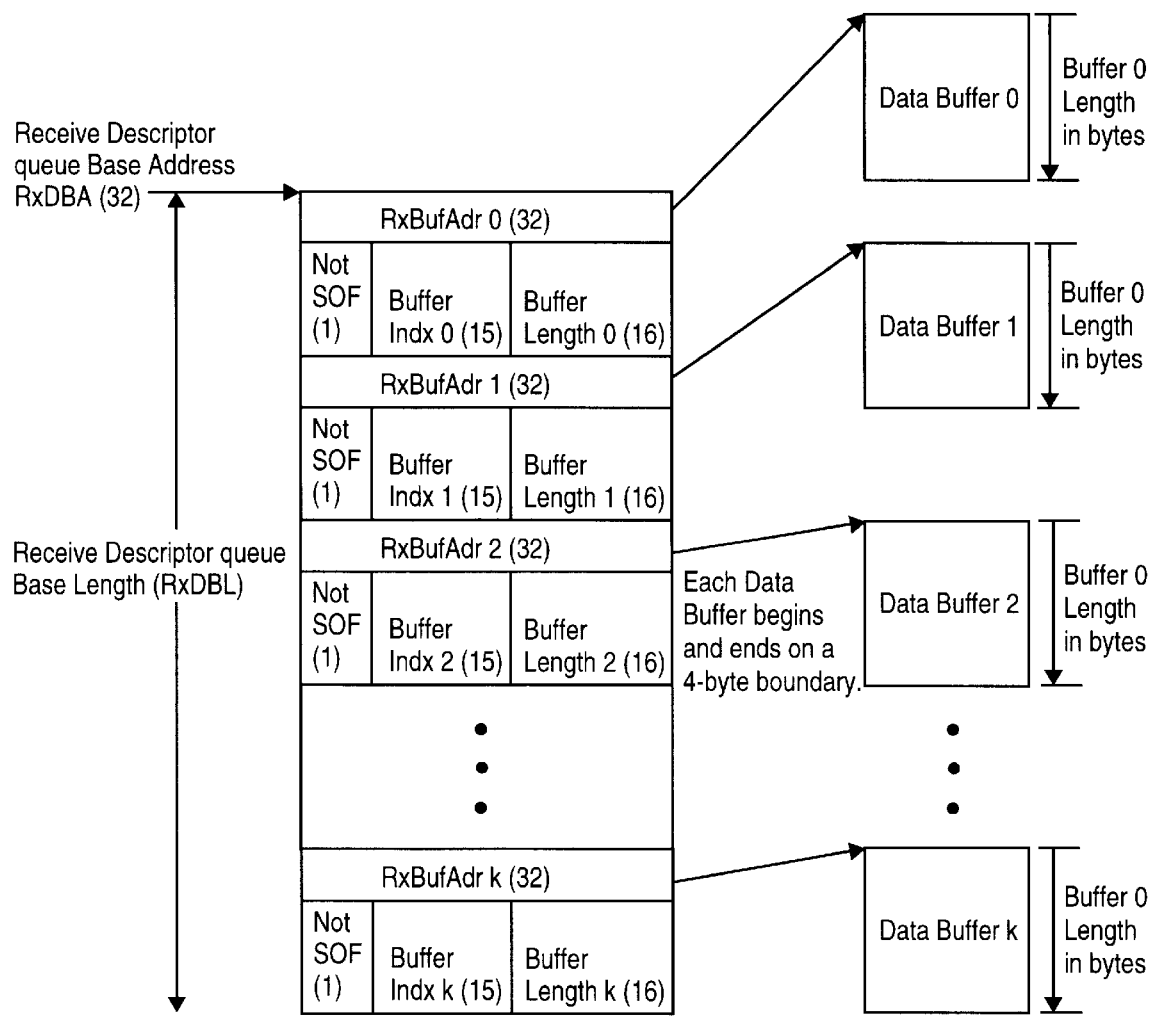
FIG. 3 depicts an exemplary format of receive descriptors.

An exemplary embodiment of a format for the receive descriptors in the receive descriptor queue 34 is depicted in FIG. 3. Each descriptor entry defines one receive data buffer, and consists of two double words (32 bits each). The first double word contains the address (RxBufAdr k) of the data buffer 30k, which is double word aligned in the exemplary embodiment. The second word contains three fields: a Not Start of Frame bit, a buffer index, and a buffer length. The buffer length field is a 16-bit value that specifies the maximum number of bytes to be used in the corresponding data buffer 30 and is an integral number of double words in certain embodiments. The buffer index is a fifteen bit value that can be used by the host CPU 12 to keep track of buffers 30 as they are exchanged with the network controller 18. When the network controller 18 reads a descriptor it keeps a copy of the index, which it includes in any receive status entry associated with that buffer 30. The Not Start of Frame bit may be set by the host CPU 18 on any buffer 30 in which it does not want a new frame to be started. Such a buffer 30 would then only be used for chaining of frame fragments. In certain embodiments of the invention, this mode is used to align frames on boundaries coarser than descriptors, such as when multiple physical address descriptors are used to describe one virtual address buffer.

The receive status queue 36 is used when passing receive status from the network controller 18 to the CPU 12. In operation, the receive status queue 36 is similar to the receive descriptor queue 34, and it is also a circular queue in contiguous memory space in certain embodiments of the invention. The location and size of the receive status queue 36 are set at initialization by the CPU 12 writing to a receive status queue base address register and a receive status queue base length register (these registers not being illustrated). The receive status queue base address points to a double word aligned, memory location. The receive status queue length is set to the actual status queue length in bytes, this being an integral number of status entries and not exceeding 64 KBytes total in exemplary embodiments. A receive status current address is set to point to the first status entry to be used, this normally being the first entry (same value as the base address).

Once the receive status queue initialization is complete, the receive status enqueue register 50 (FIG. 6*a*) is used by the CPU 12 to pass free status locations (corresponding to the free buffers) to the network controller 18. The receive status enqueue register 50 may be located in either the host memory 14 or on the network controller 18. The CPU 12 writes the number of additional free status locations available to the receive status enqueue register 50. The network controller 18 adds the additional count to the previously available to determine the total number of available receive status entries. When the network controller 18 writes status entries to the receive status queue 36, it subtracts the number of entries written from the previous total in the receive status enqueue register 50. The current value of the total receive status entries is available by reading the receive status enqueue register 50.

In certain embodiments of the invention, there is a restriction on writing too high a value to the receive status enqueue register 50, so that no more than 255 status entries may be added in one write. If a number greater than this needs to be written the write operation is broken up into more than one operation (i.e., to add 520 status entries-write 255, write 255, write 10).

Receive status entries are written to the receive status queue 36 by the network controller 18 following one of three possible events: end of header, end of buffer, or end of frame. The status entry is always written after the appropriate data transfer has been made. For example, the end of frame status is written after the last byte of data has been written to the data buffer 30, not before.

Figure 4:
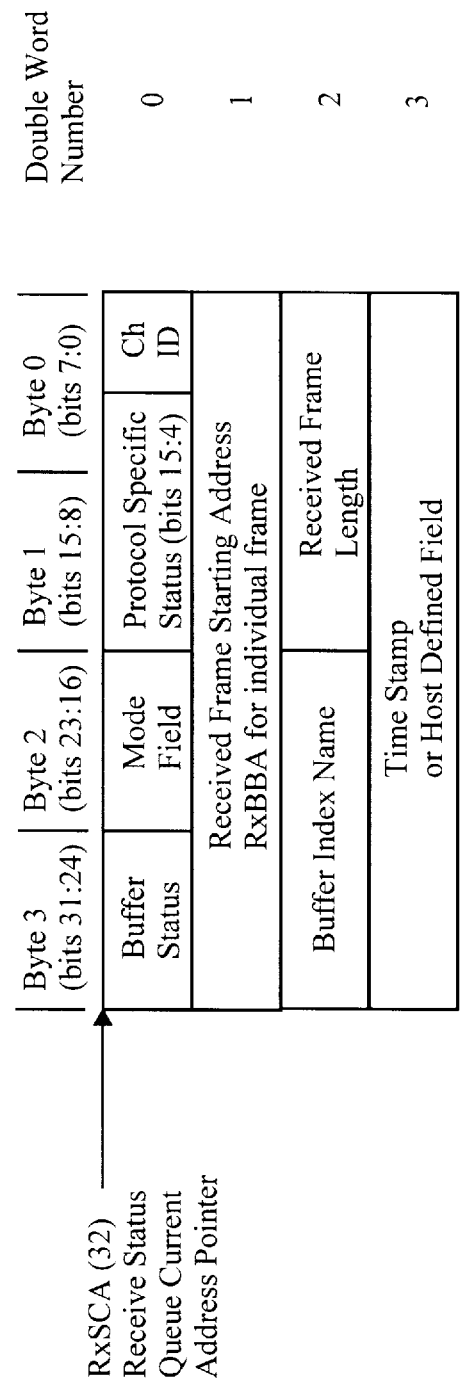
FIG. 4 depicts an exemplary embodiment of a receive status queue entry.

An exemplary embodiment of the format of one of the entries in the receive status queue 36 is depicted in FIG. 4. Each status entry comprises four double words. The first double word, DW0, includes a buffer status field that contains certain status bits that the CPU 12 will examine when reading the status entry. The relevant bits for the present invention are the end of buffer (EOB), end of frame (EOF), and subsequent frame (SQF) bits.

The mode field segment of DW0 describes the contents of the data buffer 30 as either received data or other than received data. When this field is all zeroes, the buffer contents are received data. When the mode field is not all zeroes, the contents of the buffer 30 is different from receive data, such as a diagnostic "dump".

The protocol specific status bits provide status of the received frame based on protocol specific parameters. The channel identification is placed in bits 3:0 in DWO.

The second double word (DW1) of the receive status entry is the received frame starting address for an individual frame within the buffer. This field is used in certain embodiments of the present invention, in which multiple frames can be stored in a single buffer, to identify the starting address of the individual frames.

The third double word (DW2) of a receive status entry contains the buffer index in bits 31:16. The buffer index is copied from the receive descriptor queue 34 by the network controller 18 into the descriptor FIFO 52 and the status FIFO 56, and eventually into the receive status queue 36 (FIG. 6). The buffer index is used by the CPU 12 to identify the particular buffer 30 for management purposes.

The other bits 15:0 of DW2 is the frame length, in bytes, of the portion of the buffer 30 that is used for frame data.

The fourth double word, DW3, is either a time stamp or host defined field, as selected by a bit in the channel access register space. If the bit selects the field to be a time stamp, this field is the value of a 32 bit counter at the time the status entry was created. The counter is cleared at initialization. If the bit selects the field to be a host defined field, there is a 32 bit host defined register for each channel. The host CPU 12 may place any value in this register, and the channel writes that value to this field. The host CPU 12 may place a chip identification, additional protocol information, pointers, or other information in this field.

The above described format of a receive status entry is exemplary only, as other formats are contemplated within the scope of the invention.

When a status event causes an interrupt, an interrupt pin (asserting an interrupt signal) will be activated after the status entry has been transferred to the receive status queue 36.

Figure 5:
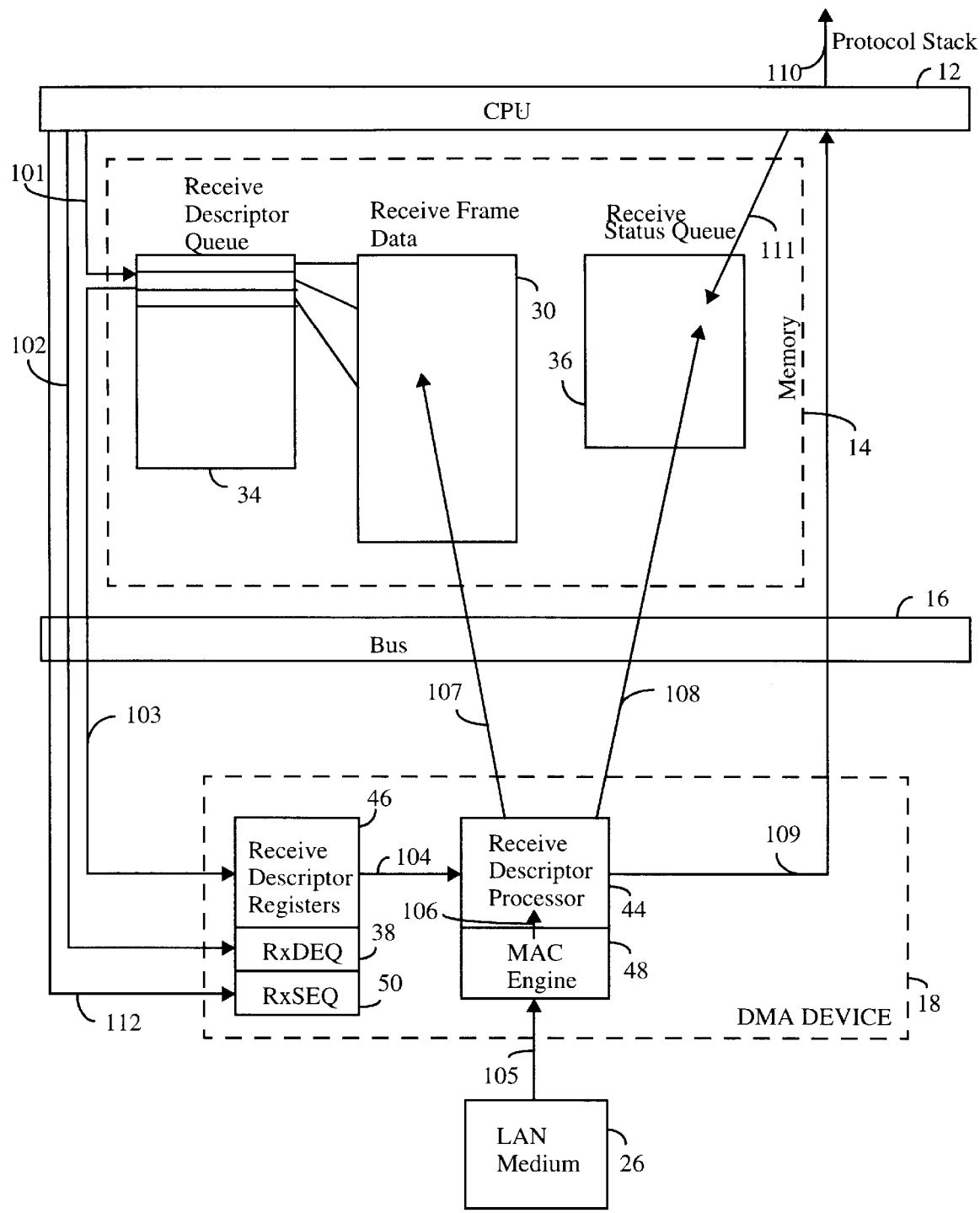
FIG. 5 is a block and flow diagram of an exemplary embodiment of a receive flow in accordance with the present invention.

An example of a receive flow in accordance with embodiments of the present invention is depicted in a block and flow diagram of FIG. 5. In this diagram, the components of the arrangement are depicted very schematically, for purposes of explaining the flow of receiving data. For purposes of explaining the basic receive flow, assume that only one frame is stored in each buffer 30. In further examples, associated with FIG. 11, multiple frames are stored in individual buffers 30.

In step 101, the CPU 12 initializes some number of receive descriptors in the receive descriptor queue 34. The CPU 12 writes the receive descriptor enqueue register 38 (shown in this embodiment as located on the network controller 18) with the additional number of receive descriptors, in step 102. An on-chip receive descriptor processor 44 of the network controller 18 fetches the receive descriptors from the receive descriptor queue 34 into an internal FIFO (receive descriptor registers) 46 in step 103. The receive descriptor processor 44 will at the same time decrement the receive descriptor enqueue register 38 for each receive descriptor fetched. The address of the next receive data buffer 30, obtained from one of the fetched receive descriptors, is then loaded into the receive buffer current address register of the receive descriptor processor 44, in step 104.

A frame of data is received by the network controller 18 over one of the channels, e.g. a local area network (LAN) medium 26, in step 105. A media access controller (MAC) engine 48 passes the frame of data to the receive data FIFO of the receive descriptor processor 44 in step 106. The receive descriptor processor 44 stores the frame of data into one or more buffers 30 in host memory 14, in step 107. The above three steps can overlap one another.

In step 108, the end of frame (EOF) status is written to the receive status queue 36, and the receive status enqueue register 50 is decremented by one. If specified interrupt conditions are met, the CPU 12 is interrupted. The received frame is passed on for processing (to a protocol stack, for example) in step 110. The CPU 12 clears a receive frame processed bit in the status entry in the receive status queue 36 which corresponds to the data buffer(s) 30 in which the frame of data was stored, in step 111. The CPU 12 writes the number of entries processed in the receive status queue 36 in step 112, thereby freeing them for future use by the network controller 18.

FIGS. 6*a*–6*d* schematically depict the CPU 12, the host memory 14 and portions of the network controller 18, to illustrate in more detail an example of queue management according to the present invention. In FIG. 6a, queue initialization is performed, such as setting the descriptor queue length, etc. This initialization process includes loading the reference table 32 of the CPU 12 with the specific information regarding each of the individual data buffers 30A–30H. Each one of the data buffers 30A–30H has an individual index that is copied from descriptor queue 50 to descriptor FIFO 52 to receive status queue 36, as will become apparent. This avoids the need to copy all of the information in the reference table 32 for each buffer 30A–30H as the queues and FIFOs are updated to add or remove a buffer 30. Instead, this information is preserved in the reference table 32 for use by the CPU 12 at the time it processes the status entry in the receive status queue 36.

In FIG. 6a, the receive descriptor registers 46 are shown as including a descriptor FIFO 52, a data FIFO 54, and a status FIFO 56. The CPU 12 writes the number of available descriptors in the receive descriptor queue 34 into the receive descriptor enqueue 38. At initialization, in this example, there are eight available descriptors. The same value of eight is also written into the receive status enqueue register 50.

Figure 6B:
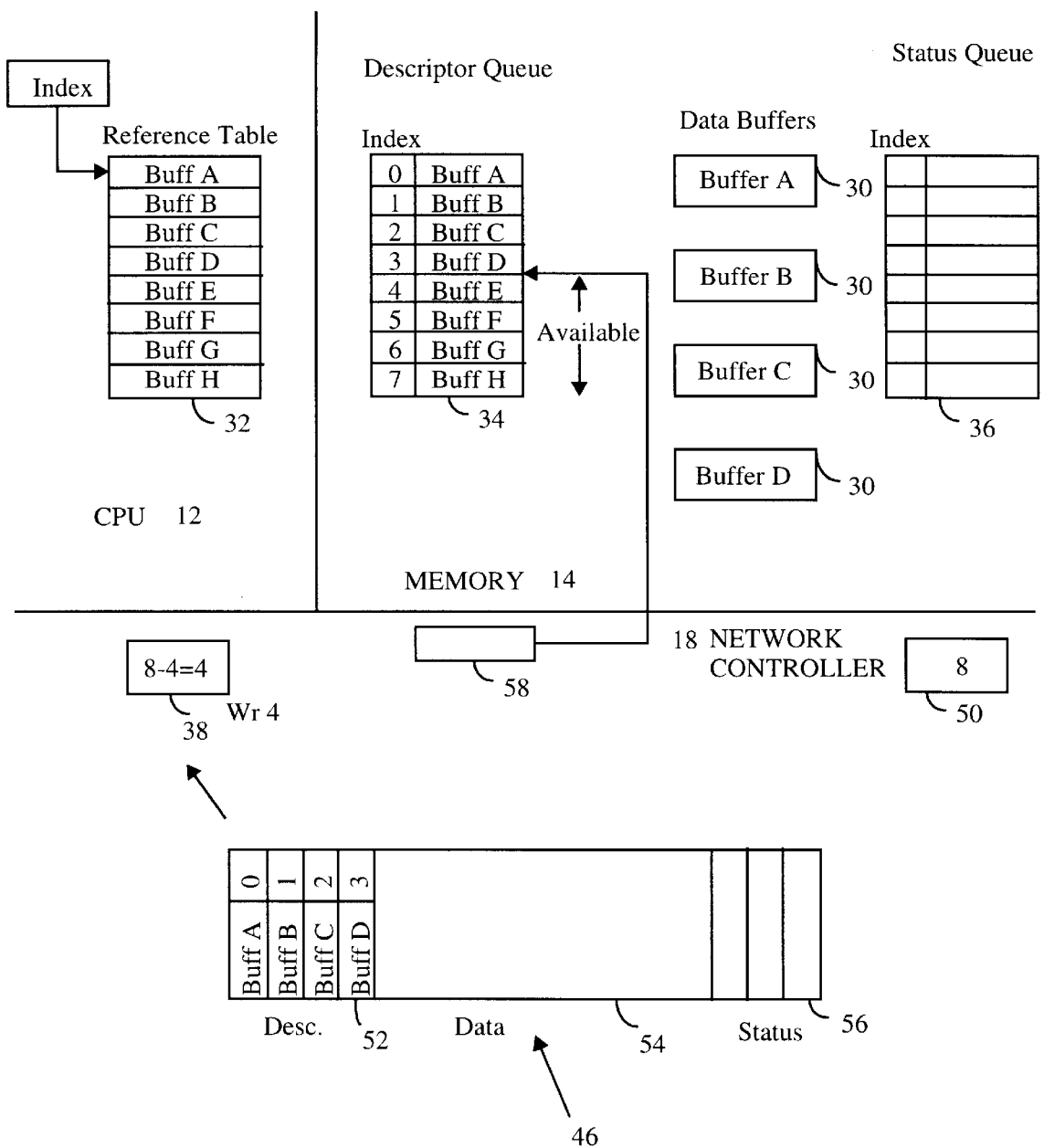

In FIG. 6b, the network controller 18 reads as many descriptors as it can fill into its descriptor FIFO 52. The network controller 18 will also write the number of descriptors that have been written into its FIFO 52 into the receive data enqueue register 38. This number is subtracted from the previously written value. In this example, the descriptor FIFO is 4 deep, so that the descriptors for four data buffers 30A–30D are written into the descriptor FIFO 52. The value 4 is written back into the receive descriptor enqueue register 38, leaving a value of 4 (8−4=4) in the receive descriptor enqueue register 38. The contents of the receive descriptor enqueue register 38 represents the number of currently available descriptors (corresponding to buffers 30) in the receive descriptor queue 34.

When the network controller 18 reads the descriptors into the descriptor FIFO 52, it also copies the accompanying index for the buffers 30A–30H. A receive descriptor queue current address register 58 in the network controller 18 is updated to point to the next available buffer (buffer 30E in FIG. 6B) in the receive descriptor queue 34. The receive descriptor queue current address register 58 provides the address necessary for the network controller 18 to gain access to the next available register(s) when made available by the CPU 12, as indicated by writing to the receive descriptor enqueue register 38.

Figure 6C:
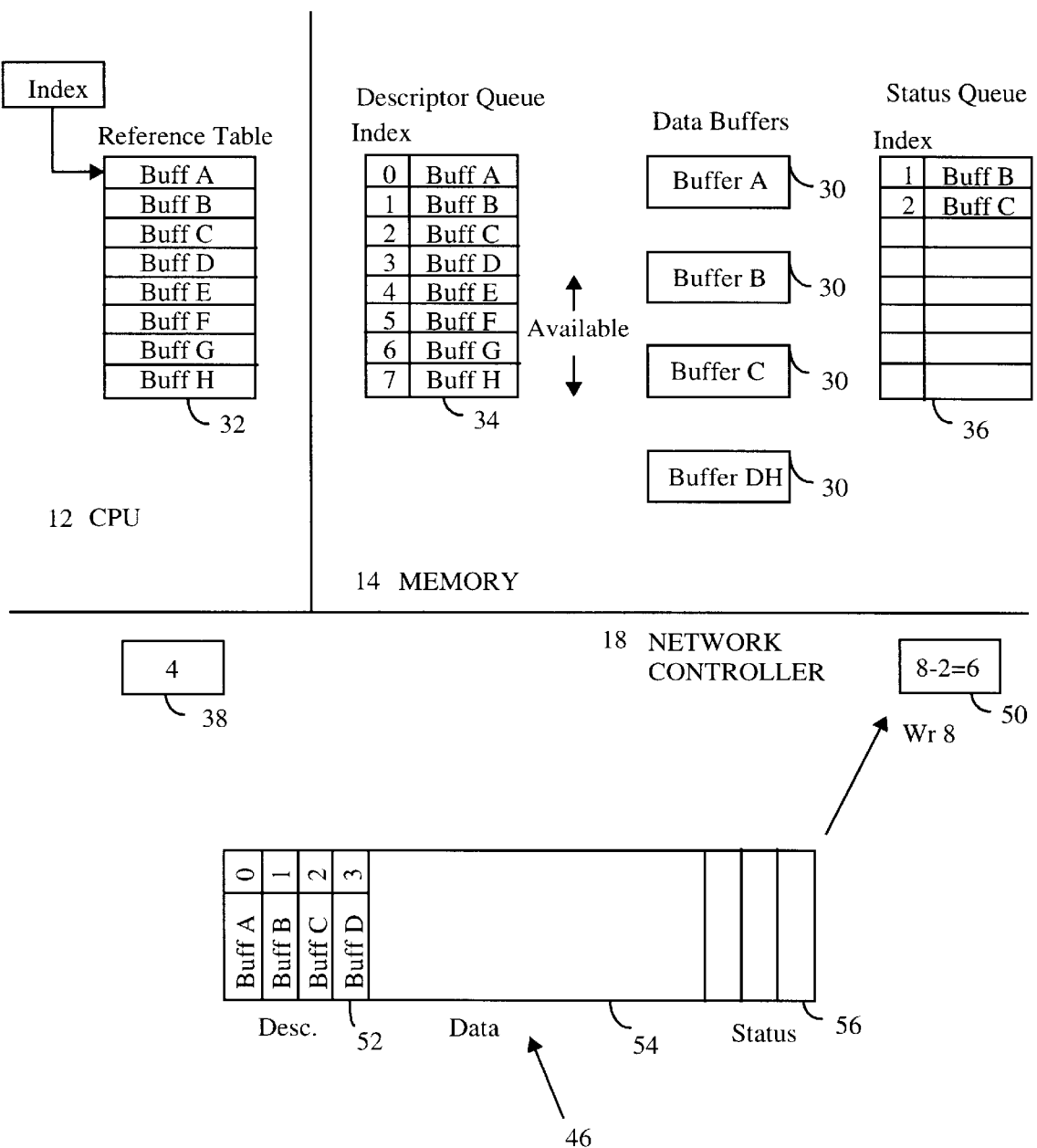

Assume for this operational example that data frames are being received on two different channels of the network controller, channels 3 and 4, for example. Assume also that the source connected on channel 4 is sending data frames faster than the source connected on channel 3. Referring to FIG. 6C, the data frames that are being received are temporarily stored in the data FIFO 54. The data frames are then stored in one or more of the buffers 30A–30D that are in the descriptor FIFO 52. The first source of data frames to finish transmission of a data frame or frames, the source on channel 4, will fill one or more buffers 30 before the source on channel 3. In this example, data buffers 30B and 30C (having indices 2 and 3 respectively) are filled with data from the source on channel 4, while data buffers 30A and 30D (with indices 1 and 4 respectively) are filled with data from the source on channel 3.

The data buffers 30B, 30C fill with data first in this example, and status entries for these buffers are written to the receive status queue 36 from the status FIFO 56. The indices (1 and 2) for the data buffers 30B, 30C are copied into the status FIFO 56 from the descriptor FIFO 52. The indices are also copied into the receive status queue 36. This makes the indices available for use by the CPU 12 with the reference table index 32 to obtain any information necessary on buffers 30B, 30C. The information itself, such as buffer length, was not copied from descriptor queue 34 to descriptor FIFO 52 to status FIFO 56 to receive status queue 36. Instead, only the index for each buffer is copied.

The receive status enqueue register 50 is decremented by 2, representing the number of available status entries in the receive status queue 36. After the two status entries are written into the receive status queue 36, there remain six available (free) status entries in the receive status queue 36. The receive status enqueue register 50 therefore holds the value of 6 (8−2=6) after it is decremented.

The writing of the status entries into the receive status queue 36 causes an interrupt. The CPU 12 will read the status entries, as well as their indices. In the illustrated example, the CPU 12 will read index 1 and determine that buffer 30B was the buffer actually used. The CPU 12 may then decide to pass on the information in the buffer 30B elsewhere, discard the data, or otherwise process the status entry. The same will occur for the other status entry associated with buffer 30C.

Figure 6D:
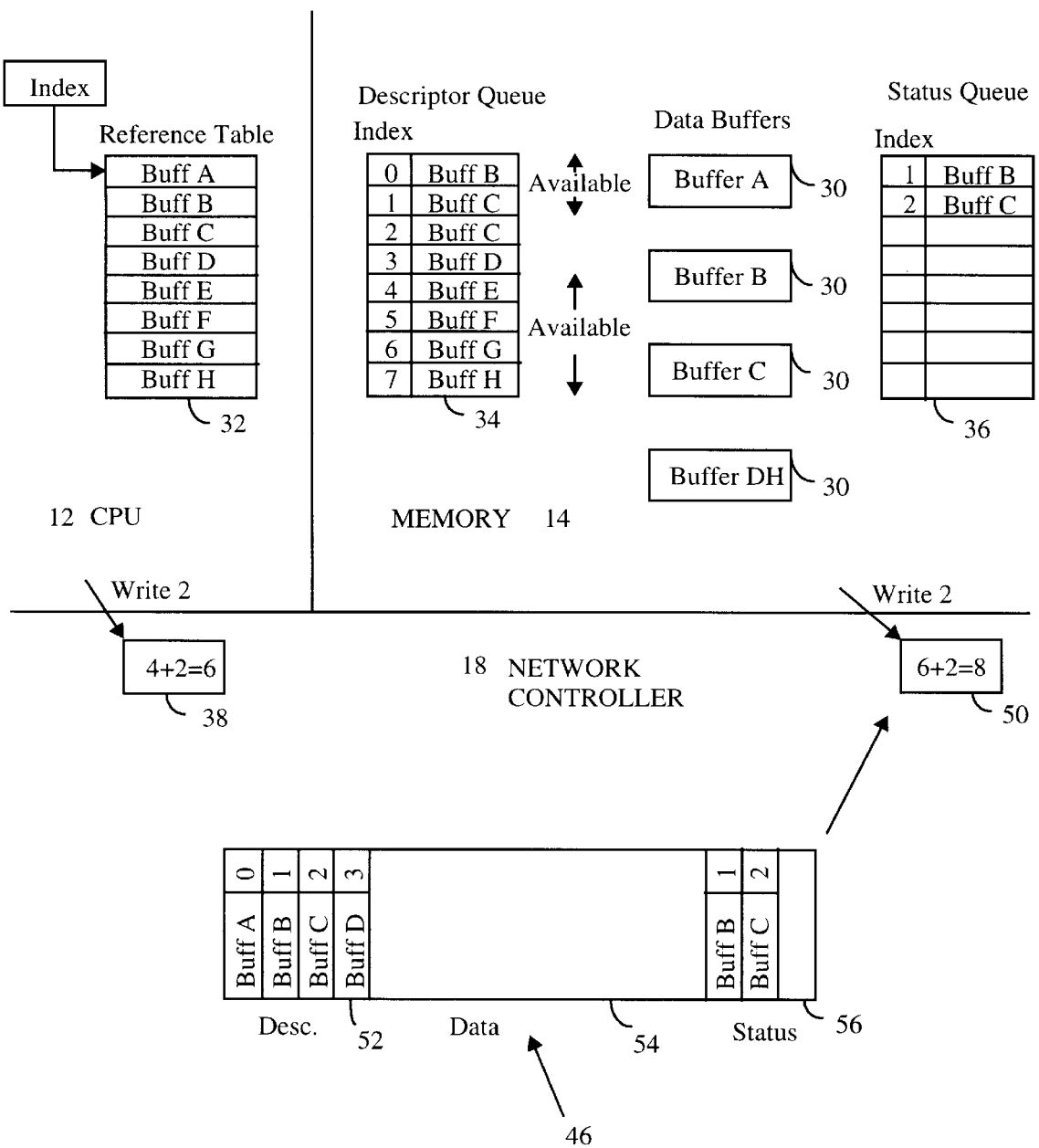

After processing, the CPU 12 returns the buffers 30B, 30C to the receive descriptor queue 34 so that they may be used once again (FIG. 6D). The CPU 12 therefore writes the descriptors and indices for buffers 30B, 30C into the next two locations in the circular receive descriptor queue 34 following the last one of the available buffers (30H in this example). The CPU 12 also writes the value of 2 into both the receive descriptor enqueue register 38 and the receive status enqueue register 50, causing both of their values to be incremented by 2. The value in the receive descriptor enqueue register 38 is 6 (4+2=6), representing the number of available buffers 30 in the receive descriptor queue 34. The value in the receive status enqueue register 50 is 8 (6+2=8), representing the number of available status entries in the receive status queue 36.

At the point in the process depicted in FIG. 6D, the descriptors in the bottom four locations (for buffers 30E–30H) of the receive descriptor queue 34 are available, as are those for the next two locations in the receive descriptor queue 34, located at the top two locations (now for buffers 30B and 30C) in the receive descriptor queue 34. Locations three and four in the receive descriptor queue 34 do not contain descriptors that are available.

After the operational step depicted in FIG. 6D, there are 6 receive descriptors available in the receive descriptor queue in the order of 30E, 30F, 30G, 30H, 30B and 30C. The descriptors for buffers 30A and 30D are in the descriptor FIFO 52, and may be filling up with data frames from the source on channel 3. The value in the receive descriptor enqueue register 38 is 6, indicating that there are 6 descriptors available for moving from the receive descriptor queue 34 into the descriptor FIFO 52. The value in the receive status enqueue register is 8, indicating that there are 8 status entries available in the receive status queue 36.

The order of the receive descriptors in the receive descriptor queue 34 is different at this stage in the operation than immediately after initialization. As more data frames are received over different channels, the order of the descriptors (and therefore the buffers) will bear no relation to their initial order. However, this is not a concern as the available descriptors and buffers are always contiguous in the circular receive descriptor queue 34. There is no need to mark the descriptors as available or not available since the receive descriptor current address register 58 is always updated to point to the next available descriptor, and it is known how many descriptors are available. For example, in FIG. 6D, it is known from the receive descriptor current address register 58 that the next available descriptor is for buffer 30E (the fifth location in the receive descriptor queue 34). It is also known from the receive descriptor enqueue register 38 that there are 6 available receive descriptors. Therefore, the CPU 12 and the network controller 18 are aware that buffer 30E and the descriptors for the next 5 buffers which follow buffer 30E in the receive descriptor queue 34, in whatever order, are available.

Figure 7:
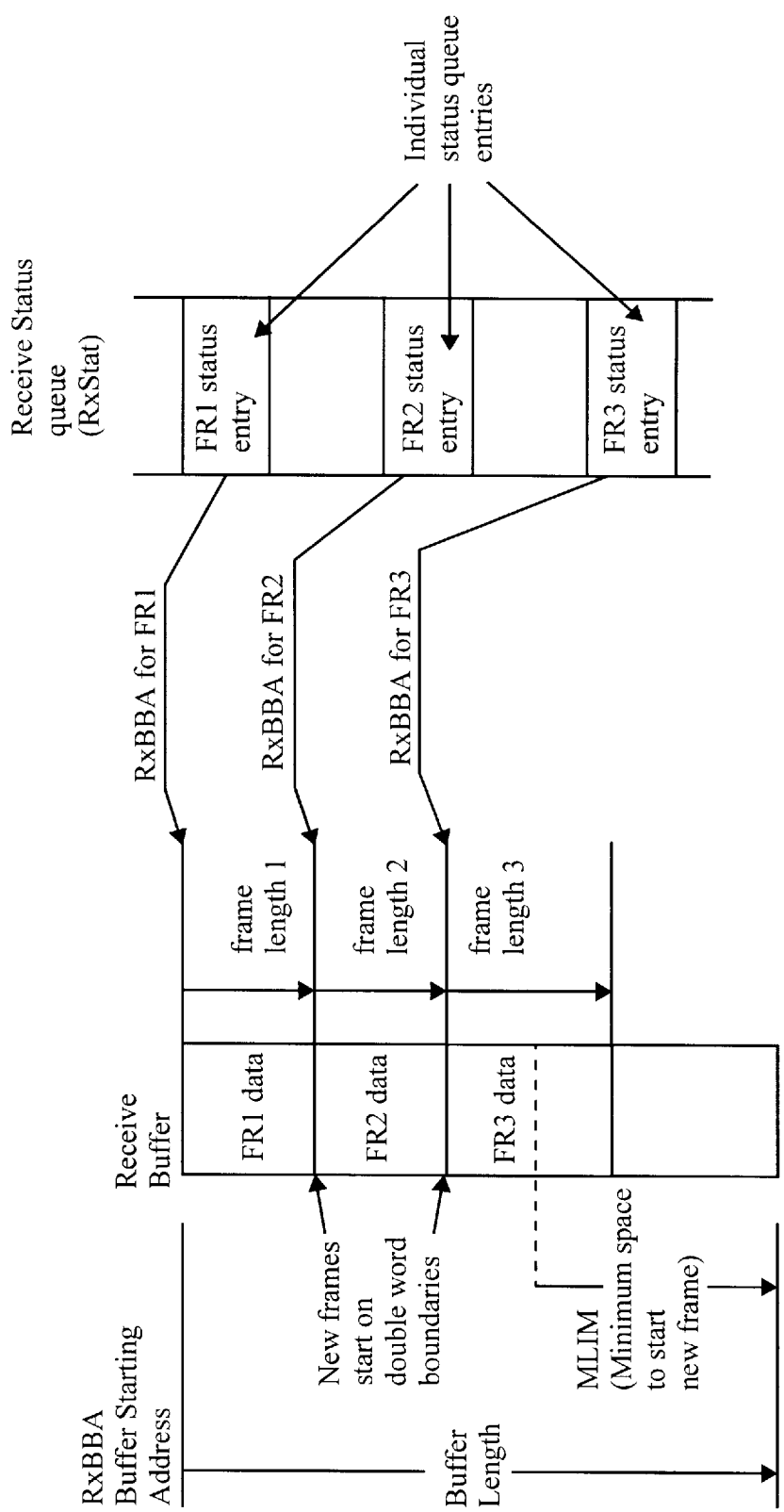
FIG. 7 is a block diagram of a single data buffer and multiple frames that are stored in the data buffer in accordance with certain embodiments of the present invention.

FIG. 7 is a block diagram of a single receive buffer 30 and a portion of the receive status queue 36, depicting a number of status entries. Placing multiple frames within one buffer optimizes the use of a buffer. The buffer 30, in certain embodiments, is large enough to hold long data frames. Storing only a single short frame of data within a single buffer 30 is an inefficient use of the buffer 30 and the memory 14. Also, each time a buffer 30 is used, a receive descriptor is read from the receive descriptor queue 34. When there is a burst of short frame data, the buffers 30 would be used up quickly, and a great number of receive descriptors have to be quickly retrieved. This situation is only exacerbated by the greater bandwidth demand imposed by systems with multiple channels. The chances of losing frames therefore increases.

The present invention alleviates this problem by allowing multiple short frames to be placed in the same buffer 30. The CPU 12 will enable or disable this particular feature for the individual channels.

When the first frame FR1 is received in a buffer 30, the channel creates a new status entry as described earlier. The subsequent frame bit (SQF) is zero, and the receive buffer starting address pointer (RXBBA) is pointing to the start of the buffer 30. The end of frame bit (EOF) is set to 1, and the end of buffer bit (EOB) is set to zero.

When a second frame (FR2) is placed in the same buffer 30, as illustrated in FIG. 7, then a new receive status entry is created in the receive status queue 36 at the completion of the second frame FR2. In this new receive status entry, the SQF bit is set to 1. The buffer starting address pointer in the second receive status entry points to the staring address for the second received frame FR2. The EOF bit is set to 1, and the EOB bit is set to zero.

If a third frame (or Nth frame, depending on frame length) is placed in the same buffer, then another new status entry is created for this frame as well. The SQF bit is set to 1, and the buffer starting address is updated to point to the starting address of this newly received frame. Assume, however, that the third frame FR3 is the last frame to be placed into the buffer 30. In that instance, the EOF bit is set to 1, and the EOB bit is also set to 1. This indicates that not only the end of the frame (FR3), but the end of the buffer 30.

If a received frame is a very long frame so that it exceeds the length of the buffer 30, then the EOF bit is set to zero, indicating that the end of the frame is not reached. The EOB bit, however, is set to 1, indicating that the end of the buffer 30 is reached. This allows "chaining", in which multiple buffers 30 are used to store a single long frame of data. A logic table of the EOF and EOB bits is provided in FIG. 8.

In certain embodiments of the present invention, there is a minimum limit MLIM programmed into a channel specific register. The minimum limit MLIM is measured from the end of the buffer 30. The first frame FR1 is received into the buffer 30 independent of the value or operation of MLIM. Before a new frame (after the first frame) is received into the buffer 30, the network controller 18 determines the amount of space remaining in the buffer 30. If the remaining space is smaller than the minimum limit MLIM, the network controller 18 does not start a new frame into the buffer 30.

In certain embodiments, the following rules are followed. Only one channel uses one buffer at a time. Any new frame after the first frame is not started in the buffer beyond the programmable MLIM limit. New frames are started on double word boundaries.

Figures 8, 9:
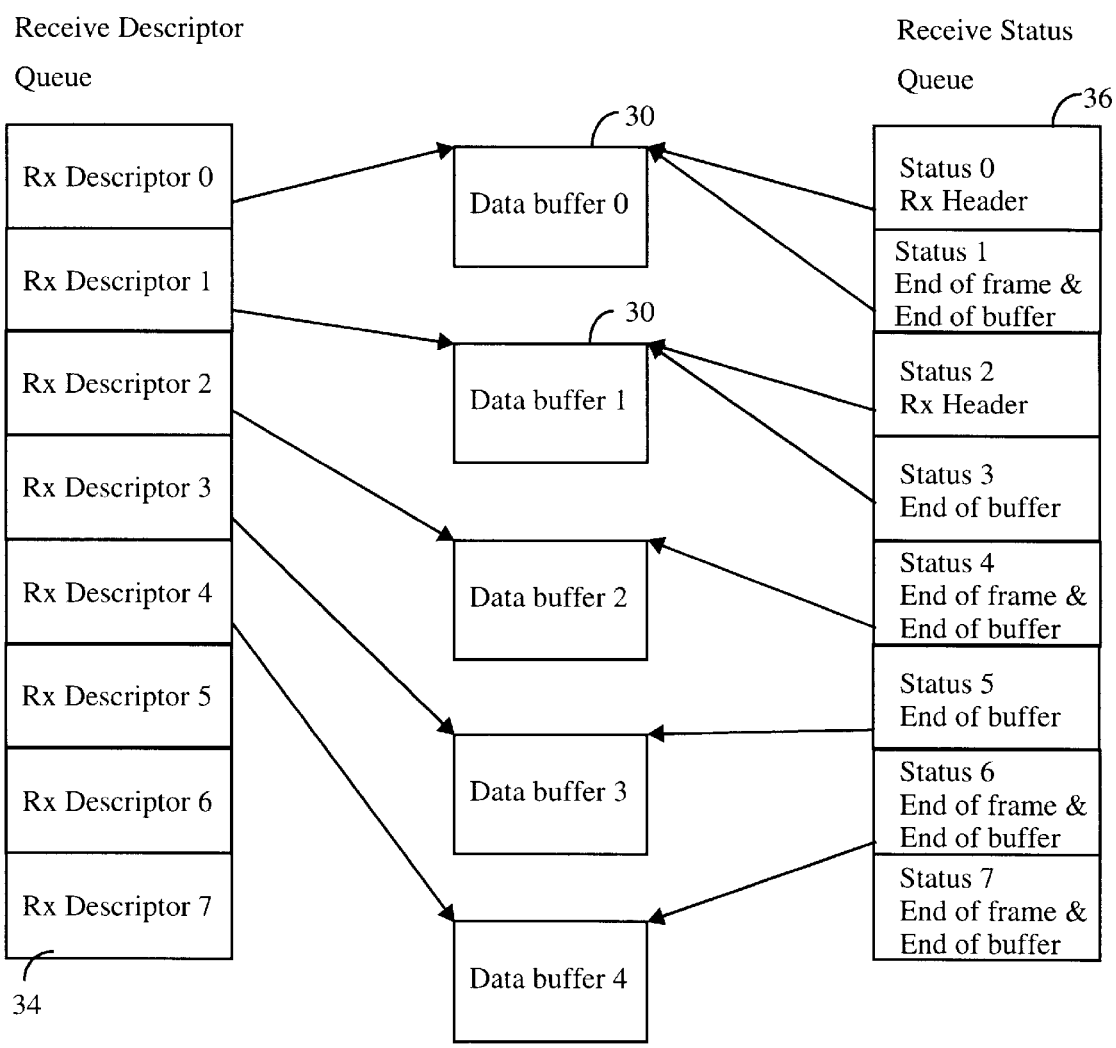
FIG. 8 is a table of status bits in the receive status entry created in accordance with an embodiment of the present invention.
FIG. 9 is a block diagram depicting the state of a receive descriptor queue and a receive status queue upon the reception of an exemplary sequence of data frames in accordance with embodiments of the present invention.

FIG. 9 is a simplified block diagram of the receive descriptor queue 34, data buffers 30, and the receive status queue 36 for illustrating the reception of four data frames in accordance with an embodiment of the present invention. The first frame uses data buffer $30_0$ only, and there are two status entries (status 0 and status 1) associated with the first frame. The first status (status 0) is for the reception of a receive header and the second (status 1) is for the end of frame/buffer, both status entries pointing to the beginning of the data buffer 0. The second frame occupies two buffers (data buffers 1 and 2) and three status entries (2, 3, and 4). Status 2 is for the receive header, status 3 for the end of buffer 1 (frame size larger than buffer size), and status 4 for end of frame/buffer. The next two frames both occupy one data buffer each and one status each, this could be the case for short frames which do not exceed the header size or the buffer size.

As can be seen from the example of FIG. 9, in operation the status queue 36 may be used at a different rate than the descriptor queue 34, based on the type of traffic and whether multiple frames per buffer are selected.

Figure 10:
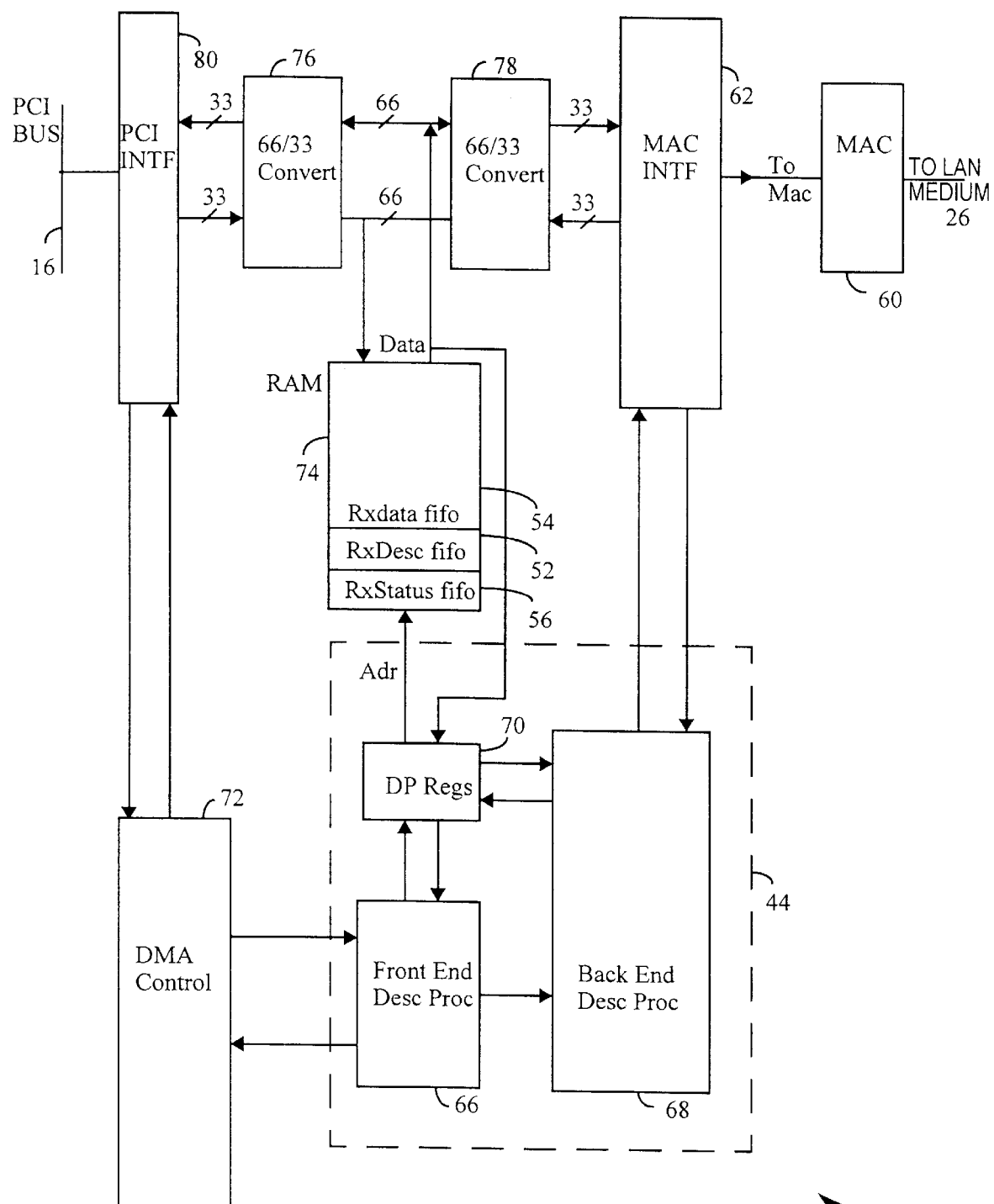
FIG. 10 is a block diagram of a network controller constructed in accordance with an embodiment of the present invention.

An exemplary embodiment of the network controller 18 is depicted in the block diagram of FIG. 10. The network controller 18 includes a media access controller (MAC) 60 and a MAC interface 62, which connect the network controller 18 to the multiple external channels. Control signals for the MAC interface 62 are passed between a descriptor processor 44 and the MAC interface 62. The descriptor processor includes a front end descriptor processor 66, a back end descriptor processor 68 and descriptor processor registers 70. The descriptor processor 44 processes the descriptors from the receive descriptor queue 34, and interfaces with a DMA controller 72 and a random access memory (RAM) 74. The RAM 74 contains the descriptor FIFO 52, the data FIFO 54 and the status FIFO 56. Although only the receive descriptor FIFO 52, the receive data FIFO 54 and the receive status FIFO 56 were depicted in FIGS. 6A–6D, the RAM 74 also contains a transmit descriptor FIFO, transmit data FIFO and a transmit status FIFO in exemplary embodiments. These transmit FIFOs have not been depicted in the Figures so as not to obscure the present invention.

The network controller 18 has a pair of 66/33 converters 76 and 78, which convert data between single and double words for storage in the RAM 74. The 66/33 converter 76 is coupled to a bus interface 80 that couples the network controller 18 to the bus 16. In the exemplary embodiment of FIGS. 1 and 2, the bus 16 is a PCI bus, so the bus interface 80 is a PCI interface.

Figure 11:
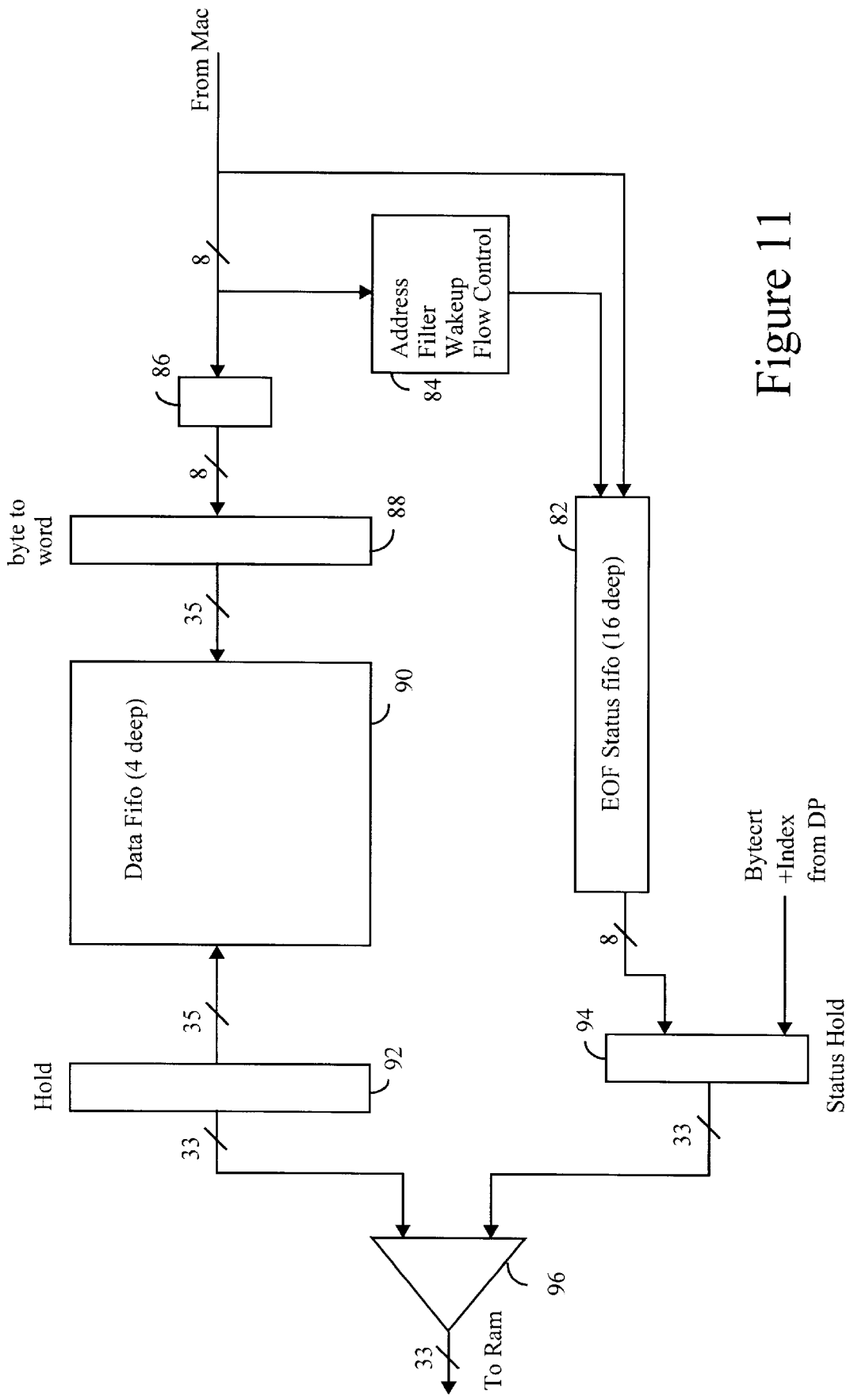
FIG. 11 is a block diagram of a media access controller interface constructed in accordance with an embodiment of the present invention.

FIG. 11 is a block diagram of the receive portion of the MAC interface 62 constructed in accordance with an embodiment of the present invention. From the MAC 60, a byte (8 bits) of information is directly provided to an end of frame status FIFO 82, which in the exemplary embodiment, is 16 deep. The end of frame status FIFO 82 also receives as an input a signal from a flow control 84 that also performs address filtering.

From a hold circuit 86, the bytes are provided to a byte-to-word converter 88. The words are then sent to a data FIFO 90 that is four deep, for example. The words are provided from the data FIFO 90 to a hold circuit 92. The output of the end of frame status FIFO 82 is sent to another hold circuit, the status hold circuit 94. The outputs of the status hold circuit 94 and the hold circuit 92 are coupled to an amplifier 96 whose output is coupled to the RAM 74 (FIG. 2) through the 66/33 converter 78.

The specific block diagrams of the network controller 18 according to FIGS. 10 and 11 are exemplary only, as other configurations of the network controller and the receive MAC interface, as well as the location and arrangement of the various registers and FIFO's, are contemplated within the spirit and scope of the present invention.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A method of managing a direct memory access (DMA) operation, comprising:

receiving a sequence of data frames at a controller in a DMA transfer; and placing the data frames in data buffers in a memory, wherein multiple data frames are stored by the controller in at least one of the data buffers.

2. The method of claim 1, further comprising creating a status entry in a receive status queue whenever a data frame is stored in one of the data buffers, wherein the status entry includes status information relating to the storing of multiple data frames in a data buffer.

3. The method of claim 2, wherein the status information for the status entry of a data frame includes end of frame information that indicates whether a complete data frame was stored in the data buffer.

4. The method of claim 3, wherein the status information for the status entry of a data frame includes end of buffer information that indicates whether a data buffer is terminated with that data frame.

5. The method of claim 4, wherein the status information for the status entry of a data frame includes subsequent frame information that indicates whether the data frame is a first data frame in the data buffer or a subsequent data frame in the data buffer.

6. The method of claim 5, further comprising comparing a remaining storage space in the data buffer with a minimum limit prior to storing a subsequent data frame in the data buffer, the subsequent data frame not being stored in the data buffer when the remaining storage space is less than the minimum limit.

7. The method of claim 1, wherein the status entry further includes a frame buffer starting address that points to the starting address of a data frame.

8. The method of claim 1, wherein the step of receiving data frames includes receiving the data frames over a plurality of channels.

9. The method of claim 8, wherein the controller is a network controller that places the data frames into the data buffers and creates the status entries in the status queue.

10. A method of managing a multi-channel direct memory access (DMA) operation, comprising:

storing descriptors of data buffers in locations of a circular descriptor queue;

obtaining with a network controller a set of available descriptors from the descriptor queue; and performing a DMA transfer with a host system via the network controller using at least some of the available data buffers whose descriptors were obtained, including storing multiple data frames in at least one of the data buffers.

11. The method of claim 10, further comprising the network controller indicating to the host system which data buffers were used in the DMA transfer.

12. The method of claim 11, wherein the step of indicating to the host system which data buffers were used in the DMA transfer includes writing in a receive status queue a status entry for each data frame transferred in a DMA transfer, the status entry identifying the data buffer in which the data frame is stored.

13. The method of claim 12, wherein each status entry includes status information relating to the storing of multiple data frames in a data buffer.

14. The method of claim 13, wherein the status information for the status entry of a data frame includes end of frame information that indicates whether a complete data frame was stored in the data buffer.

15. The method of claim 14, wherein the status information for the status entry of a data frame includes end of buffer information that indicates whether a data buffer is terminated with that data frame.

16. The method of claim 15, wherein the status information for the status entry of a data frame includes subsequent frame information that indicates whether the data frame is a first data frame in the data buffer or a subsequent data frame in the data buffer.

17. The method of claim 16, further comprising comparing a remaining storage space in the data buffer with a minimum limit prior to storing a subsequent data frame in the data buffer, the subsequent data frame not being stored in the data buffer when the remaining storage space is less than the minimum limit.

18. The method of claim 17, wherein the status entry further includes a frame buffer starting address that points to the starting address of a data frame.

19. The method of claim 10, further comprising the step of receiving data frames over a plurality of channels.

20. The method of claim 19, wherein the data frames are received by a network controller that stores the data frames into the data buffers and creates the status entries in the receive status queue.

21. The method of claim 10, wherein the descriptors are stored in a block of locations that are contiguous to one another in the descriptor queue, the set of descriptors being unavailable in the descriptor queue after being obtained by the network controller; and further comprising refilling the descriptor queue with the descriptors of the data buffers used in the DMA transfer, the descriptors being refilled in the locations in the descriptor queue that immediately follow the location of a last one of the available descriptors in the descriptor queue, the refilled descriptors constituting newly available descriptors in the descriptor queue, such that all of the available descriptors in the descriptor queue are always in contiguous locations in the descriptor queue.

22. An arrangement for managing multi-channel direct memory access (DMA) transfers of data, comprising:

a bus;

a host system having a central processing unit (CPU) and a memory coupled to the bus, the memory having a plurality of data buffers;

a multi-channel network controller coupled to the bus, the network controller transferring data frames received at the network controller to the host system via data buffers that are available for use, wherein multiple data frames are stored in at least one of the data buffers.

23. The arrangement of claim 22, wherein the memory further includes a receive status queue to which a status entry is written after each data frame is placed in a data buffer used in a DMA transfer.

24. The arrangement of claim 23, wherein each status entry includes status information relating to the storing of multiple data frames in a data buffer.

25. The arrangement of claim 24, wherein the status information for the status entry of a data frame includes end of frame information that indicates whether a complete data frame was stored in the data buffer.

26. The arrangement of claim 25, wherein the status information for the status entry of a data frame includes end of buffer information that indicates whether a data buffer is terminated with that data frame.

27. The arrangement of claim 26, wherein the status information for the status entry of a data frame includes subsequent frame information that indicates whether the data frame is a first data frame in the data buffer or a subsequent data frame in the data buffer.

28. The arrangement of claim 27, further comprising comparing a remaining storage space in the data buffer with a minimum limit prior to storing a subsequent data frame in the data buffer, the subsequent data frame not being stored in the data buffer when the remaining storage space is less than the minimum limit.

29. The arrangement of claim 25, wherein the status entry further includes a frame buffer starting address that points to the starting address of a data frame.

30. The arrangement of claim 23, wherein the step of receiving data frames includes receiving the data frames over a plurality of channels.

* * * * *